(12) United States Patent
Maeda

(10) Patent No.: US 7,099,473 B2
(45) Date of Patent: Aug. 29, 2006

(54) INFORMATION PROCESSING APPARATUS AND METHOD

(75) Inventor: Mitsuru Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 957 days.

(21) Appl. No.: 09/761,721

(22) Filed: Jan. 18, 2001

(65) Prior Publication Data

US 2001/0033660 A1  Oct. 25, 2001

(30) Foreign Application Priority Data

Jan. 21, 2000  (JP) .............................. 2000-012965

(51) Int. Cl.
*H04N 7/167* (2006.01)
(52) U.S. Cl. ..................... 380/239; 380/201; 380/204; 380/217; 380/232; 713/168; 726/26; 726/30
(58) Field of Classification Search ................ 380/217, 380/239, 39, 43
See application file for complete search history.

(56) References Cited

U.S. PATENT DOCUMENTS

| 5,353,062 | A | | 10/1994 | Maeda |
| 5,799,081 | A | * | 8/1998 | Kim et al. ................... 380/203 |
| 6,031,914 | A | * | 2/2000 | Tewfik et al. ................. 380/54 |
| 6,178,242 | B1 | * | 1/2001 | Tsuria ........................ 380/201 |
| 6,219,422 | B1 | * | 4/2001 | Sato ........................... 380/240 |

OTHER PUBLICATIONS

Berkeley.edu web site, "History of MPEG", Berkely University, "www.sims.berkeley.edu/courses/is224/s99/GroupG/report1.html", Apr. 6, 1999,entire document.*
Dawson,Ken, "MPEG-4: A Bird's Eye View", Carleton Univeristy, Hello World!, Iss. 2, vol. 1, "http://www.cosc.brocku.ca/~cspress/HelloWorld/1999/04-apr/mpeg4_a_birds_eye_view.html", entire article.*
Li, Yongcheng, et al,'Security Enhanced MPEG Player', Dept. of Computer Science, Univ. of Illinois at Urbana-Champaign, 1996, entire document, http://choices.cs.uiuc.edu/Papers/Vosaic/se_mpeg_player.pdf.*

* cited by examiner

*Primary Examiner*—Ayaz Sheikh
*Assistant Examiner*—Ronald Baum
(74) *Attorney, Agent, or Firm*—Fitzpatrick, Cella, Harper & Scinto

(57) ABSTRACT

There is provided an information processing apparatus/method characterized by inputting information data, generating security data to be used to protect the information data, encoding the information data to generate encoded data, extracting a unique predetermined code indicating a specific meaning from encoded data within a security section in accordance with the security data, superimposing the security data on the predetermined code, scrambling the encoded data except for the predetermined code within the security section, and outputting the superimposed predetermined code and the scrambled encoded data.

40 Claims, 11 Drawing Sheets

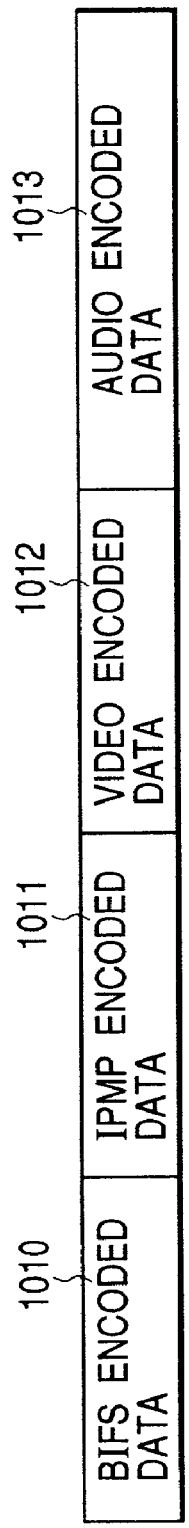

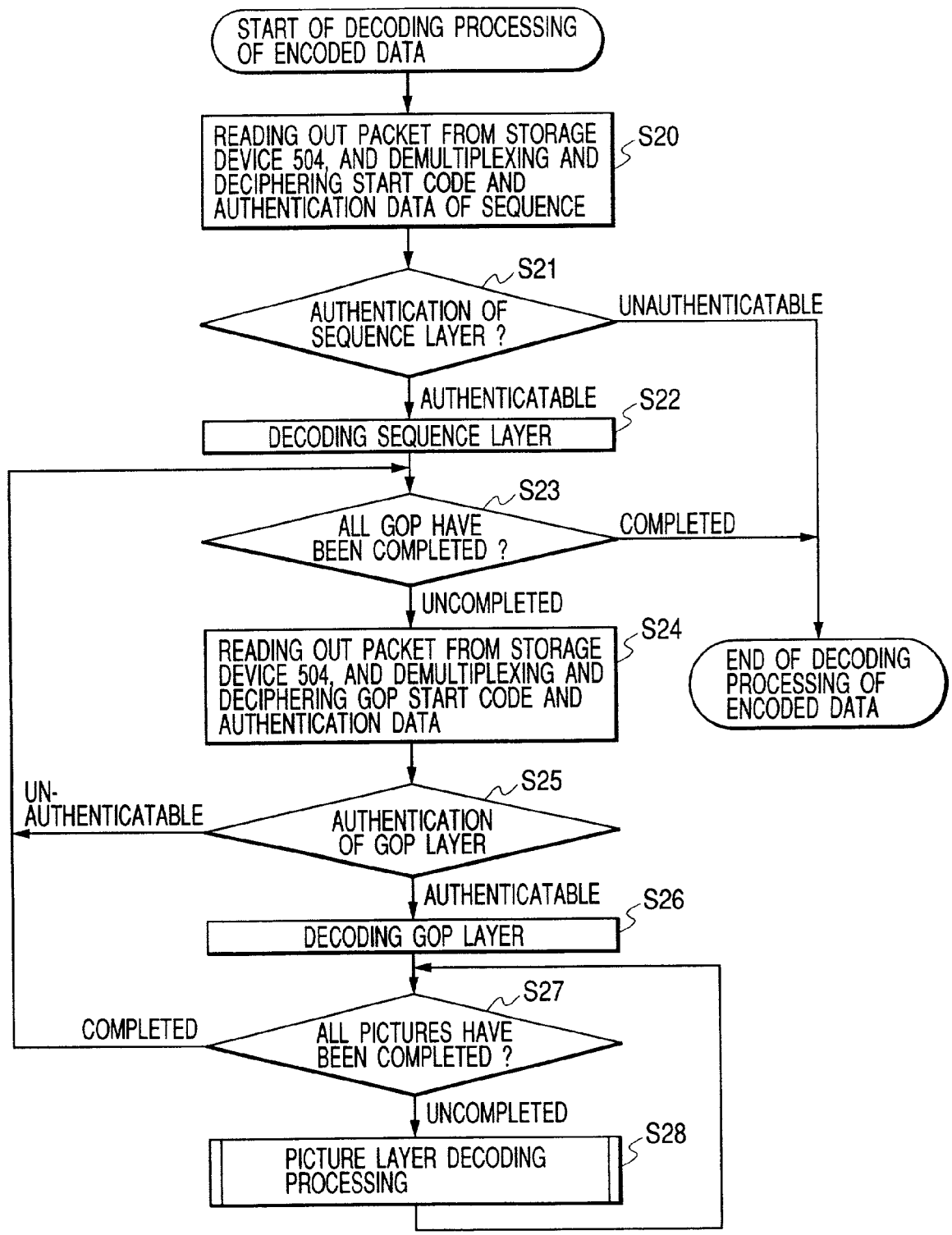

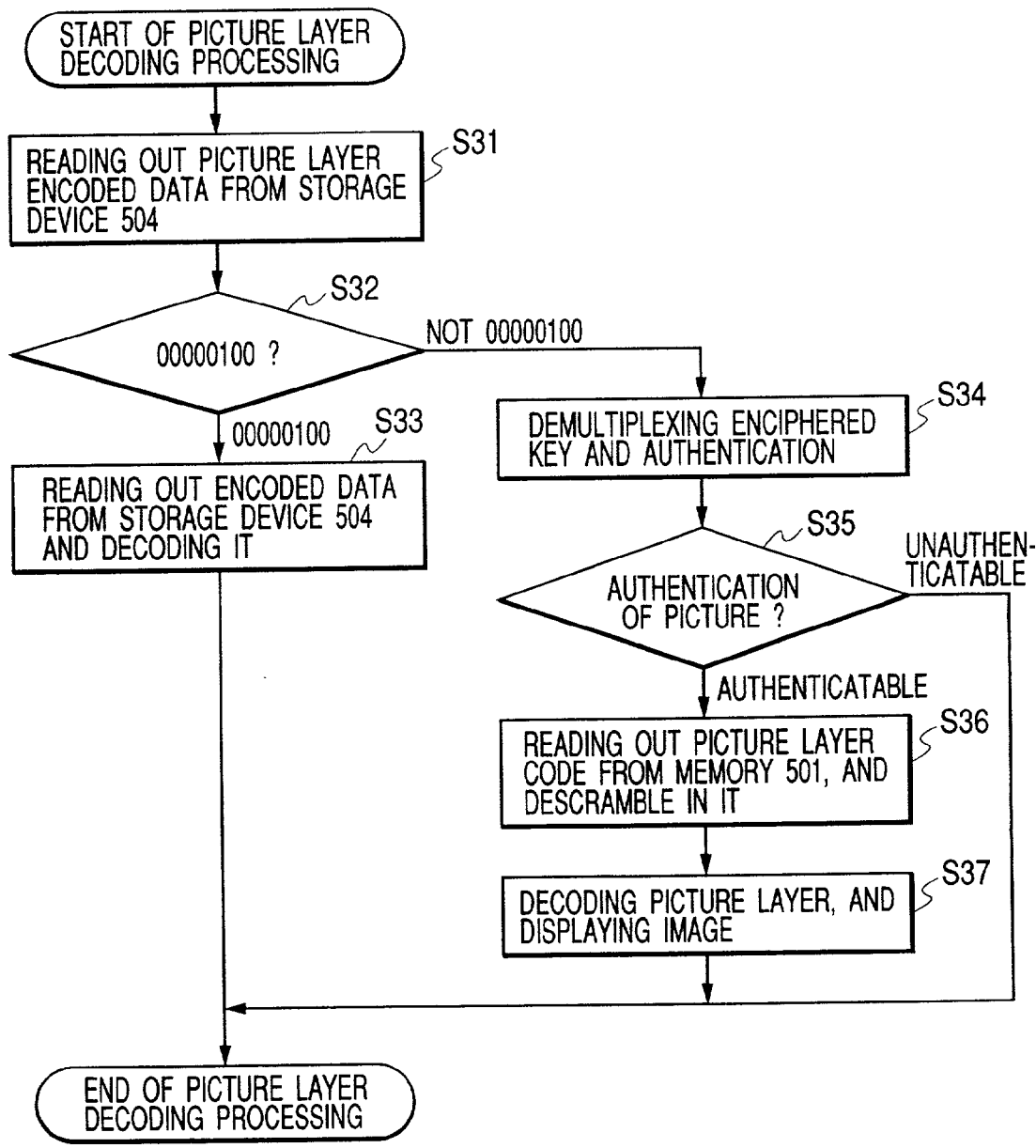

INFORMATION PROCESSING APPARATUS AND METHOD

BACKGROUND OF THE INVENTION

1. Field of the Invention

The present invention relates to an information processing apparatus and method and, more particularly, to information processing for protecting intellectual properties (e.g., copyrights) of information data.

2. Related Background Art

Conventionally, as image coding schemes, coding schemes such as Motion JPEG, Digital Video, and the like which use intra-frame coding, and coding schemes H.261, H.263, MPEG-1, MPEG-2, and the like which use inter-frame predictive coding are known. These coding schemes have been internationally standardized by ISO (International Organization for Standardization) and ITU (International Telecommunication Union). Intra-frame coding is best suited to apparatuses which require edit and special playback processes of moving images, since it encodes in units of frames, and allows easy management of frames. On the other hand, inter-frame coding can assure high coding efficiency since it uses inter-frame prediction.

Furthermore, international standardization of MPEG-4 as versatile next-generation multimedia coding standards which can be used in many fields such as computers, broadcast, communications, and the like is in progress.

As such digital coding standards have prevailed, the contents industry strongly recognizes a problem of intellectual property (e.g., copyright) protection. That is, contents cannot be provided with confidence using standards which cannot sufficiently guarantee copyright protection.

To solve this problem, MPEG-4 can describe data in Systems (ISO 14496-1) as Part 1 to build in an IPMP (Intellectual Property Management & Protection) function so as to implement copyright protection in its standards. Refer to ISO 14496-1 for further details.

FIG. 1 shows an example of the format of MPEG-4 encoded data.

Referring to FIG. 1, BIFS (Binary Format for Scene description) encoded data 1010 is obtained by encoding information such as the composition method of object, synchronization of objects, and the like described in Part 1. IPMP encoded data 1011 describes information that pertains to security of bitstreams. Video encoded data 1012 is an encoding result of image data of moving images. Audio encoded data 1013 is an encoding result of audio data appended to moving images.

FIG. 2 shows an example of information described in the IPMP encoded data 1011.

The data 1011 contains information (IPMP object encoded data) indicating encoded data set with security. In FIG. 2, the video encoded data 1012 corresponds to such data. Authentication data used to discriminate if decoding of this encoded data is permitted follows. In FIG. 2, "nonac" is authentication data. In general, this data is enciphered. In this example, the authentication data "nonac" which is provided by reversing authentication data "canon" is enciphered data.

Furthermore, the numbers of frames to be protected and information obtained by enciphering a decipher key in case of that frame data are enciphered by scrambling are described to assure security for some parts of a sequence of video data. In FIG. 2, frame Nos. 1 to 100 in video encoded data can be descrambled by decipher key "key", and frame Nos. 1000 to 1260 can be descrambled by decipher key "maeda". The IPMP encoded data 1011 is obtained by encoding these data. The video encoded data 1012 is copyrighted by scrambling frames for which the IPMP encoded data assures security.

FIG. 3 shows an example of a decoding apparatus for decoding such encoded data.

Referring to FIG. 3, an input terminal 1000 receives the IPMP encoded data 1011 and video encoded data 1012 of the encoded data of moving image data. A demultiplexer 1001 demultiplexes the input encoded data into the IPMP encoded data 1011 and video encoded data 1012. A buffer 1002 stores the video encoded data 1012 demultiplexed by the demultiplexer 1001 in units of frames.

An IPMP decoder 1003 decodes the IPMP encoded data. An authentication unit 1004 authenticates decoded data. Selectors 1005 and 1007 change their input source/output destination in accordance with the output from the authentication unit 1004. A descrambler 1006 is connected to the selector 1005. A video decoder 1008 decodes video encoded data to play back image data. An output terminal 1009 outputs playback image data.

The operation of the decoding apparatus with the above arrangement will be explained below.

The IPMP encoded data 1011 is input first from the input terminal 1000. The demultiplexer 1001 inputs the IPMP encoded data to the IPMP decoder 1003. The IPMP decoder 1003 decodes the IPMP encoded data 1011 to obtain authentication data, frame numbers as security objects, and keys for descrambling.

The authentication data is input to the authentication unit 1004 and is compared with authentication data registered in advance. If authentication is unsuccessful, the selector 1005 is directly connected to the selector 1007 not to output decoded data via the descrambler 1006. If authentication is successful, whether or not the selectors 1005 and 1007 are connected via the descrambler 1006 is selected in accordance with an instruction from the IPMP decoder 1003.

In this case, when the IPMP decoder 1003 recognizes encoded data of a frame to which security is given, it instructs the selectors 1005 and 1007 to select a path via the descrambler 1006. Otherwise, the decoder 1003 instructs the selectors 1005 and 1007 to select a path without the intervention of the descrambler 1006.

That is, the selectors 1005 and 1007 select each other as the output and input when authentication is unsuccessful in the authentication unit 1004 and when authentication is successful and the IPMP decoder 1003 determines that the descrambler 1006 is not required (i.e., no processing of the descrambler 1006 is done). On the other hand, when authentication is successful, and the IPMP decoder 1003 recognizes encoded data of a frame to which security is given, the selectors 1005 and 1007 select a path via the descrambler 1006.

Therefore, when authentication is successful, the video decoder can play back a normal image since the descrambler descrambles frames to which security is given in addition to those to which no security is given. When authentication is unsuccessful, since scrambled encoded data is input to the video decoder 1008 which cannot normally decode it, no normal playback image is generated.

However, in this arrangement, IPMP encoded data must be edited upon editing video data, resulting in complicated processes. For example, when a single bitstream is to be generated by combining with another sequence, the frame numbers change, and the contents of the IPMP encoded data must be changed. Key information for scrambling must be prepared independently of security object data, and redundant information must be appended.

SUMMARY OF THE INVENTION

It is, therefore, one object of the present invention to provide an information processing apparatus and method, which can efficiently protect intellectual properties (e.g., copyrights) of information data in consideration of the aforementioned situation.

In order to achieve the above object, an information processing apparatus/method according to one preferred aspect of the present invention is characterized by inputting information data, generating security data to be used to protect the information data, encoding the information data to generate encoded data, extracting a unique predetermined code indicating a specific meaning from encoded data within a security section in accordance with the security data, superimposing the security data on the predetermined code, scrambling the encoded data except for the predetermined code within the security section, and outputting the superimposed predetermined code and the scrambled encoded data.

An information processing apparatus/method according to another preferred aspect of the present invention is characterized by inputting encoded data in which security data is adaptively superimposed on a unique predetermined code in the encoded data, which indicates a specific meaning, and the encoded data except for the predetermined code is adaptively scrambled in accordance with the security data, extracting from the encoded data a code which is located at a position where the predetermined code is present, detecting the security data from the extracted code, and descrambling the encoded data in accordance with the detection result.

An information processing method according to another preferred aspect of the present invention is characterized by inputting image encoded data that forms a hierarchical structure, extracting a predetermined code indicating a head of a predetermined layer from the image encoded data, and superimposing security data for image protection onto the predetermined code extracted in the extraction step.

An information processing method according to another preferred aspect of the present invention is characterized by inputting encoded data in which security data is superimposed on a predetermined code indicating a head of a predetermined layer of image encoded data that forms a hierarchical structure, extracting from the encoded data a code which is located at a position where the predetermined code is present, detecting the security data from the extracted code, and decoding the encoded data in accordance with the detection result.

Other objects, features and advantages of the invention will become apparent from the following detailed description taken in conjunction with the accompanying drawings.

BRIEF DESCRIPTION OF THE DRAWINGS

FIG. 1 shows an example of the format of MPEG-4 encoded data;

FIG. 2 shows an example of information contained in IPMP encoded data;

FIG. 11 is a flow chart showing an image decoding process in the sixth embodiment of the present invention; and FIG. 12 is a flow chart showing an image decoding process in the sixth embodiment of the present invention.

DETAILED DESCRIPTION OF THE PREFERRED EMBODIMENTS

Preferred embodiments of the present invention will now be described in detail with reference to the accompanying drawings.

Figure 3:
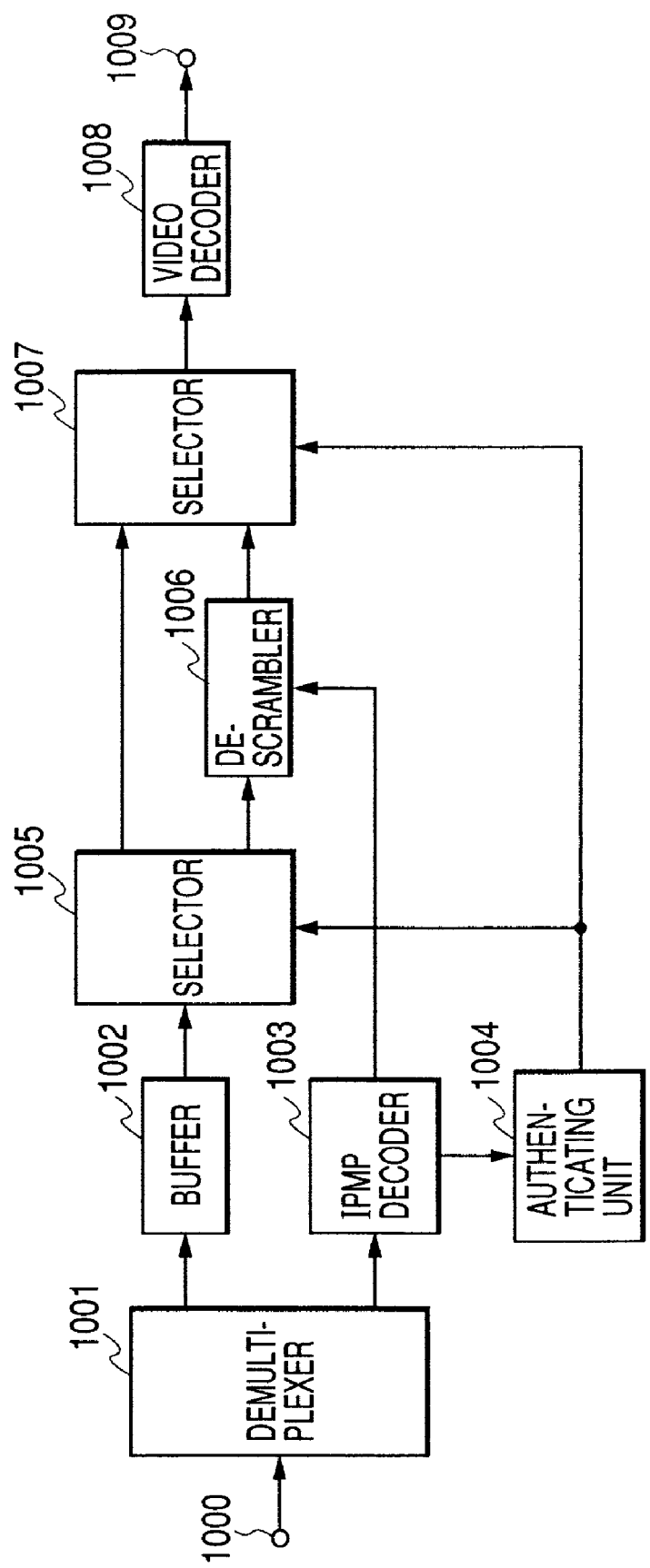
FIG. 3 is a block diagram showing the arrangement of a conventional decoding apparatus.
Figure 4:
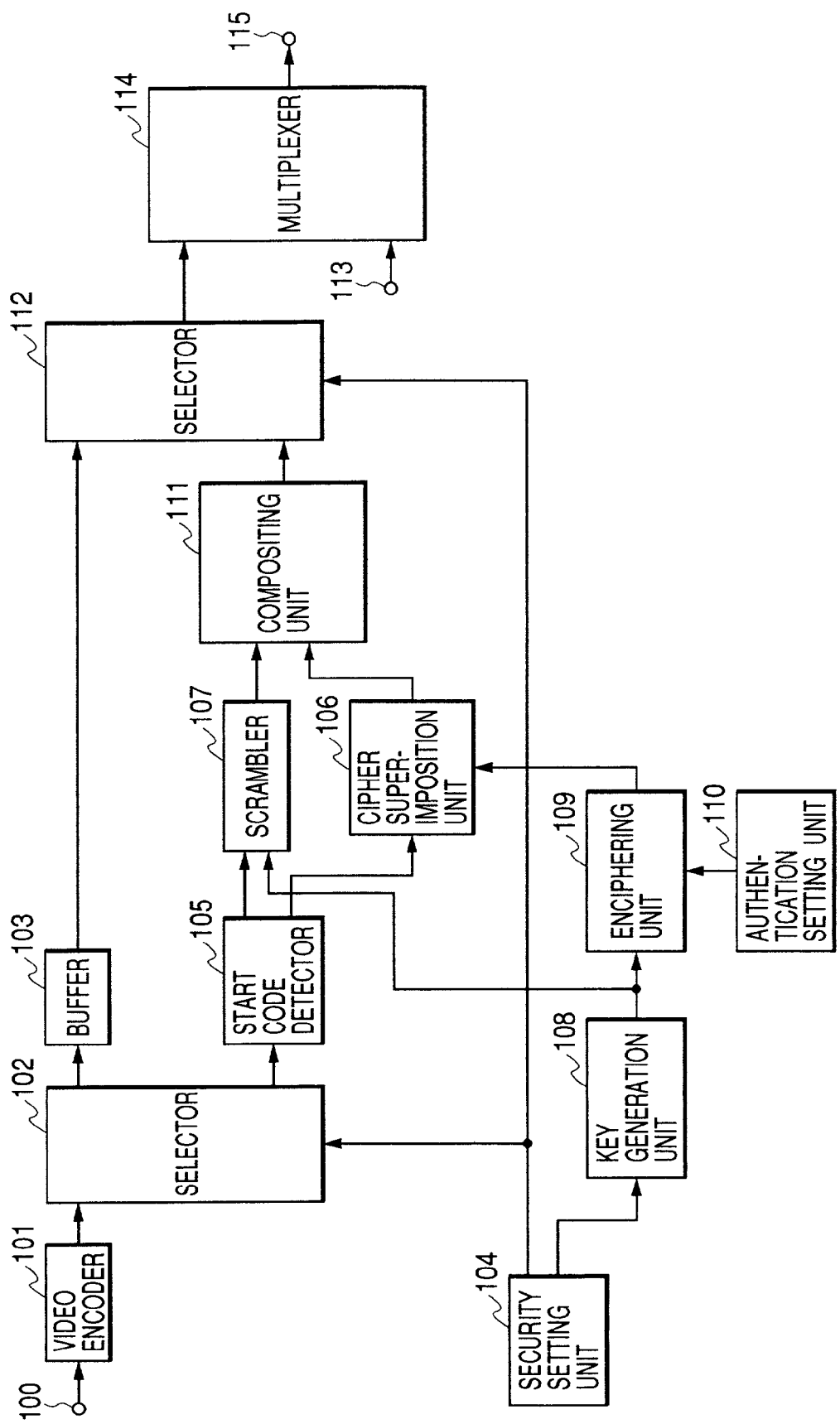
FIG. 4 is a block diagram showing the arrangement of an information processing apparatus according to the first embodiment of the present invention.

FIG. 4 is a block diagram showing the arrangement of an information processing apparatus according to the first embodiment of the present invention. Note that this embodiment will exemplify a process for copyrighting image data, but the present invention is not limited to image data but may be applied to audio data and the like. As a video coding scheme, MPEG-4 will be exemplified. However, the present invention is not limited to such specific scheme, and other coding schemes such as H.261, H.263, MPEG-1, MPEG-2, and the like may be used.

Referring to FIG. 4, an input terminal 100 inputs image data in units of frames. A video encoder 101 encodes moving images by MPEG-4. A security setting unit 104 sets security for protecting (e.g., copyrights) of moving images. Selectors 102 and 112 select their input source/output destination in accordance with an instruction from the security setting unit 104.

A buffer 103 temporarily stores encoded data. A detector 105 detects a start code from the encoded data. A key generation unit 108 generates a key for scrambling encoded data to protect security. An authentication setting unit 110 sets authentication data required for canceling security.

An enciphering unit 109 enciphers input data by a given encipherment scheme, and outputs enciphered data. A cipher superimposition unit 106 superimposes enciphered data on the start code. A scrambler 107 scrambles in accordance with the aforementioned key. A compositing unit 111 composites the outputs from the cipher superimposition unit 106 and descrambler 107. An input terminal 113 externally inputs audio encoded data.

A multiplexer 114 multiplexes audio data in units of frames of video data. An output terminal 115 outputs generated encoded data.

The operation of an image data processing apparatus with the above arrangement will be described below.

The user determines and sets a section of image data to be copyrighted using the security setting unit 104. In this embodiment, security is given to frame Nos. n to (n+m) in a sequence of image data that starts from frame No. 1.

Image data is input from the input terminal 100 in units of frames, and is encoded by the video encoder 101. The encoded data is input to the selector 102 in units of frames. In this case, a frame (frame Nos. 1 to (n−1), or frame Nos. (n+m+1) or later) to which no security is given by the security setting unit 104 is input, the buffer 103 is set as the output of the selector 102 and the input of the selector 112. In this case, encoded data is output from the output terminal 115 without any security (e.g., scrambling) process.

A process for a frame (frame Nos. n to (n+m)) to which the security setting unit 104 gives security will be explained below. The security setting unit 104 makes the key generation unit 108 generate a key used to scramble the corresponding frame. The generated key is input to the scrambler 107 and enciphering unit 109.

The authentication setting unit 110 sets data required for authentication, e.g., a password, and inputs it to the enciphering unit 109. The enciphering unit 109 enciphers them by a predetermined encipherment scheme to generate enciphered data of 32 bits or less. In this embodiment, 23-bit enciphered data α is generated.

The selector 102 selects the start code detector 105 as its output destination, and the selector 112 selects the compositing unit 111 as its input source. Therefore, the encoded data input to the selector 102 is input to the start code detector 105.

Table 1 below summarizes start codes used in MPEG-4.

TABLE 1

| Code Name | Code (hex) |
| --- | --- |
| video_object_start_code | 00000100 to 0000011F |
| video_object_layer_start_code | 00000120 to 0000012F |
| Reserved | 00000130 to 000001AF |
| visual_object_sequence_start_code | 000001B0 |
| visual_object_sequence_end_code | 000001B1 |
| user_data_start_code | 000001B2 |
| group_of_vop_start_code | 000001B3 |
| video_session_error_code | 000001B4 |
| visual_object_start_code | 000001B5 |
| vop_start_code | 000001B6 |
| Reserved | 000001B7 to 000001B9 |
| face_object_start_code | 000001BA |
| face_object_plane_start_code | 000001BB |
| mesh_object_start_code | 000001BC |
| mesh_object_plane_start_code | 000001BD |
| still_texture_object_start_code | 000001BE |
| texture_spatial_layer_start_code | 000001BF |
| texture_snr_layer_start_code | 000001C0 |
| Reserved | 000001C1 to C5 |
| System start codes (see note) | 000001C6 to 000001FF |

In this embodiment, the start code detector 105 detects a VOP (Video Object Plane) start code (vop_start_code). The encoded data other than this start code is input to the scrambler 107.

The VOP start code detected by the start code detector 105 is input to the cipher superimposition unit 106. The cipher superimposition unit 106 shifts enciphered data α leftward by 9 bits, and performs an exclusive OR operation on the shifted data and VOP start code. For example, if enciphered data α is "7234A" (hexadecimal), the output from the cipher superimposition unit 106 is "E4715B6".

The key generated by the key generation unit 108 is input to the scrambler 107, which scrambles the encoded data except for the start code using the key, and inputs the scrambled data to the compositing unit 111. The compositing unit 111 composites data obtained by superimposing the enciphered data α on the VOP start code with the scrambled encoded data to have the former data at the head position.

Audio encoded data encoded by an external circuit is input from the input terminal 113, and is multiplexed with the video encoded data output from the selector 112 in units of frame. The multiplexed data is packetized, and packet data are output from the output terminal 115.

With a series of encoding, enciphering, and selection processes, encoded data security of which is warranted (its copyright is protected) can be generated without any redundancy.

In this embodiment, the start code is selected as a code to be detected. However, the present invention is not limited to such specific code, and any other codes may be detected as long as they are unique codes (indicating specific meanings), even though they have a fixed or variable length from the beginning of the data. In this embodiment, the VOP start code is detected as the start code to be detected, but the present invention is not limited to such specific start code, and higher-order start codes may be detected. For example, the key and authentication information may be superimposed on a VOL start code when security control is made in units of layers, or on a VOS start code when control is made in units of sequences.

Figure 5:
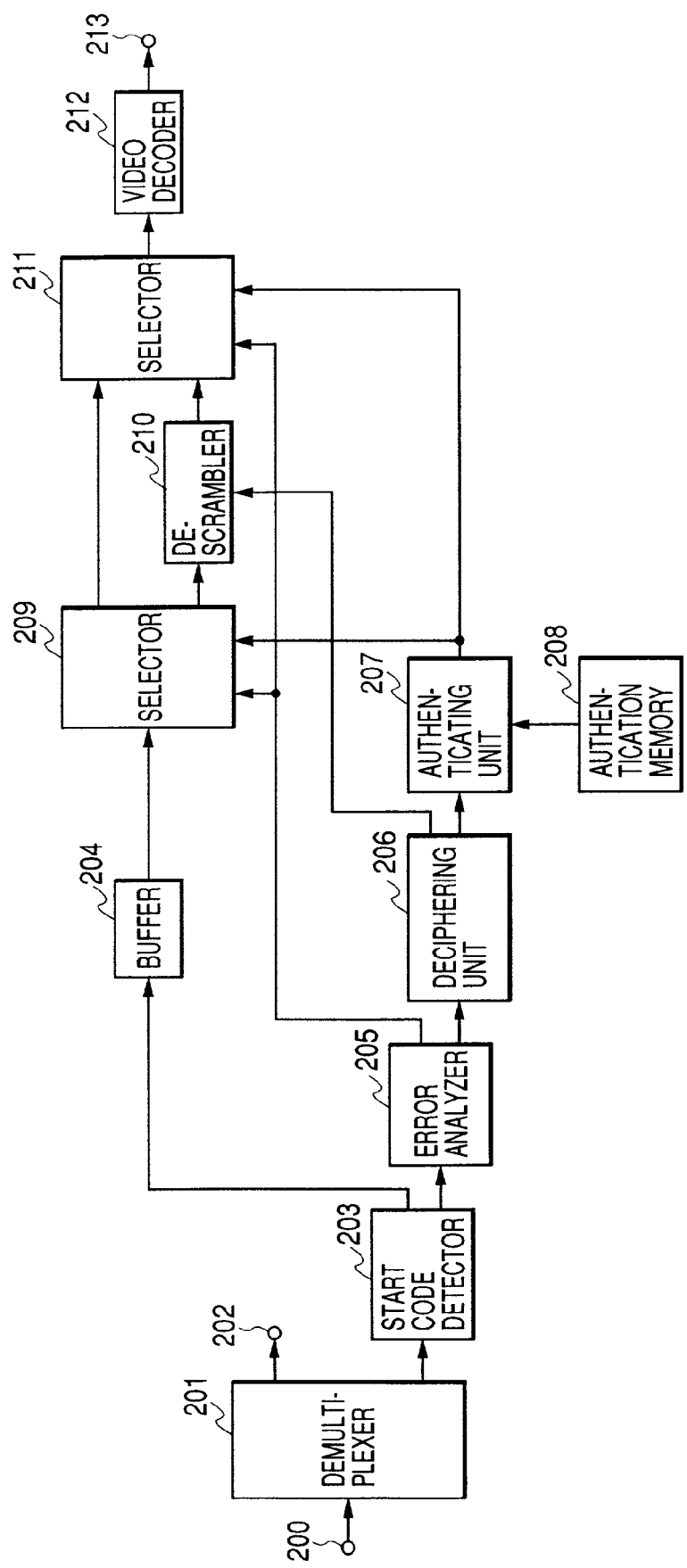
FIG. 5 is a block diagram showing the arrangement of an information processing apparatus according to the second embodiment of the present invention.

FIG. 5 is a block diagram showing the arrangement of an information processing apparatus according to the second embodiment of the present invention.

An input terminal 200 inputs encoded data. This embodiment decodes encoded data generated by the first embodiment, and the input terminal 200 is equivalently connected to the output terminal 115 in FIG. 4.

A demultiplexer 201 demultiplexes multiplexed data into audio encoded data and video encoded data. The video encoded data is output to the subsequent circuits in units of packets.

An output terminal 202 outputs the audio encoded data to an external audio decoder. A start code detector 203 detects encoded data β located at the position of the VOP start code from the input video encoded data. A buffer 204 stores encoded data other than that corresponding to the position of the start code. An error analyzer 205 extracts a difference from the VOP start code when a normal VOP start code cannot be obtained from encoded data β. A deciphering unit 206 deciphers enciphered data by a predetermined scheme. An authentication unit 207 compares authentication data extracted from the encoded data with input authentication data, and determines to cancel security when they match. An authentication memory 208 stores authentication data unique to this information processing apparatus.

Selectors 209 and 211 select their input/output in accordance with instructions from the authentication unit 207 and error analyzer 205. A descrambler 210 descrambles scrambled data. A video decoder 212 decodes video encoded data. An output terminal 213 outputs the decoded playback image data.

The operation of an image data processing apparatus with the above arrangement will be described below.

Encoded data input from the input terminal 200 is input to the demultiplexer 201. The demultiplexer 201 demultiplexes the encoded data in units of packets into video encoded data and audio encoded data, and externally outputs the audio encoded data from the output terminal 202.

The video encoded data is input to the start code detector 203. A VOP start code as a start code to be detected is always located at a 32-bit portion from the head of data when video data is encoded and packetized in units of frames. For this reason, encoded data for 32 bits from the head position is extracted, and is output to the error analyzer 205. The remaining data is output to the buffer 204.

The error analyzer 205 compares the input 32-bit encoded data with the VOP start code to obtain difference therebetween. That is, the error analyzer 205 computes the OR of the input data and VOP start code value (000001B6), and shifts the OR rightward by 9 bits. The shift result is input to the deciphering unit 206.

When the input encoded data and VOP start code are exactly the same, i.e., when no security is given, the error analyzer 205 instructs to directly connect the selectors 209 and 211 to input the input encoded data to the video encoder 212.

When security is given, and when the output from the authentication unit 207 indicates successful authentication, the selectors 209 and 211 are controlled to be connected via the descrambler 210; when authentication is unsuccessful, the selectors 209 and 211 are instructed to be directly connected to input the input encoded data to the video decoder 212.

The deciphering unit 206 deciphers the enciphered data by a predetermined scheme to obtain a scrambling key and authentication data. This deciphering scheme deciphers data enciphered by the enciphering unit 109 of the first embodiment. The key obtained by deciphering is input to the descrambler 210, and authentication data is input to the authentication unit 207.

The authentication memory 208 stores authentication data unique to this apparatus. The authentication unit 207 compares the authentication data input from the deciphering unit 206 with the authentication data stored in the authentication memory 208. If authentication is successful, and the error analyzer 205 can detect the presence of enciphered data, the selectors 209 and 211 are instructed to select a process in the descrambler 210; otherwise, the selectors are instructed to be connected directly.

The output from the selector 211 is input to the video decoder 212. The video decoder 212 decodes input data to generate a playback image. As a result, as for frames to which no security is given, the video decoder 212 directly receives and decodes the output from the demultiplexer 201 via the buffer 204 and the selectors 209 and 211 and can obtain a normal playback image.

On the other hand, when security is set, if authentication fails, the scrambled video encoded data is input, and since the enciphered data remains superimposed on the VOP start code, the VOP start code cannot be detected. Therefore, the encoded data cannot be decoded, and a normal playback image cannot be obtained. Even when security is set, if authentication is successful, the scrambled data can be descrambled, and a normal playback image can be obtained.

With a series of selection, deciphering, and decoding processes, image playback can be done in accordance with the intended security level.

In this embodiment, the output from the error analyzer 205 is input to the deciphering unit 206. In addition, the presence/absence of an error may be checked, and if any error is found, the video decoder 212 may be controlled to stop. In this manner, even when no function of detecting a start code at the head of data is available, the video decoder can be prevented from erroneously operating due to wrong data.

Figure 6:
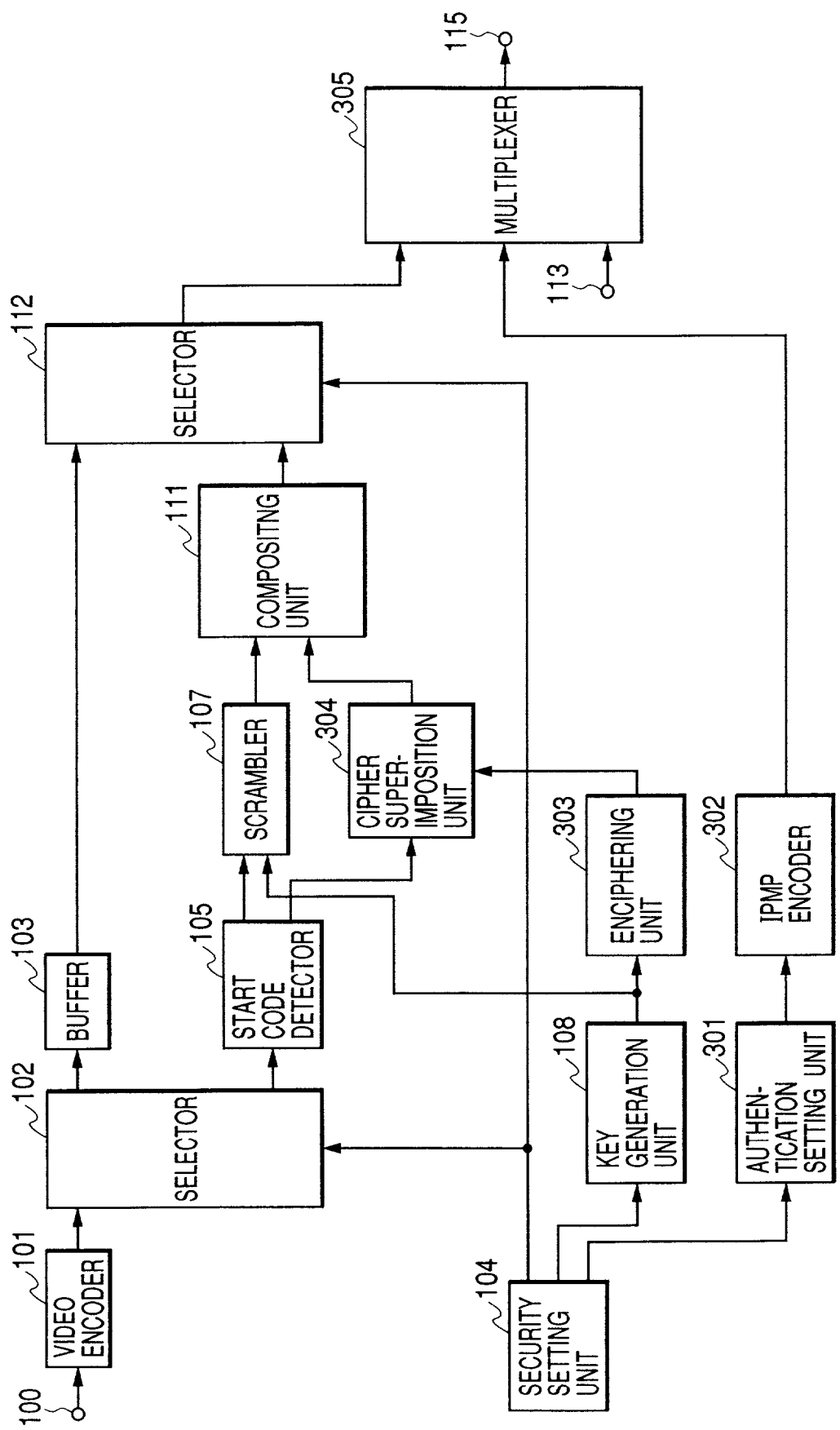
FIG. 6 is a block diagram showing the arrangement of an information processing apparatus according to the third embodiment of the present invention.

FIG. 6 is a block diagram showing the arrangement of an information processing apparatus according to the third embodiment of the present invention. Note that the same reference numerals denote the same building components as in the first embodiment (FIG. 4) mentioned above, and a detailed description thereof will be omitted.

An authentication setting unit 301 allows the user to set authentication data. An IPMP encoder 302 generates IPMP encoded data. An enciphering unit 303 enciphers in the same manner as the enciphering unit 109 of the first embodiment, but enciphers a key alone. A cipher superimposition unit 304 superimposes the enciphered data on a start code as in the cipher superimposition unit 106 of the first embodiment. A multiplexer 305 also multiplexes IPMP encoded data in addition to video and audio encoded data of the multiplexer 114 of the first embodiment.

The operation of the an image data processing apparatus with the above arrangement will be described below.

The user determines and sets a section of image data to be copyrighted using the security setting unit 104 as in the first embodiment. The authentication setting unit 301 makes the operator set data required for authentication, e.g., a password, and inputs it to the IPMP encoder 302. The IPMP encoder 302 gives security to (e.g., copyrights) the video encoded data in accordance with the IPMP format, and enciphers and encodes the data required for authentication set by the authentication setting unit 301. The output from the IPMP encoder 302 is multiplexed by the multiplexer 305 prior to the video and audio encoded data, and is output from the output terminal 115.

Image data is input from the input terminal 100 in units of frames, and is encoded by the video encoder 101. The encoded data is input to the selector 102 in units of frames. For image data of frames to which no security is given by the security setting unit 104, no security such as scrambling is given to encoded data as in the first embodiment, and the encoded data is output from the output terminal 115.

A process for image data of frames to which the security setting unit 104 gives security will be explained below.

The security setting unit 104 makes the key generation unit 108 generate a key used to scramble the corresponding frame. The generated key is input to the scrambler 107 and enciphering unit 303. The enciphering unit 109 enciphers the key by a predetermined encipherment scheme to generate enciphered data of 32 bits or less. In this embodiment, 32-bit enciphered data γ is generated.

The selector 102 selects the start code detector 105 as its output destination, and the selector 112 selects the compositing unit 111 as its input source. Therefore, the encoded data input to the selector 102 is input to the start code detector 105. The start code detector 105 detects a VOP start code. Encoded data other than the VOP start code is input to the scrambler 107. The detected VOP start code is input to the cipher superimposition unit 304. The cipher superimposition unit 304 performs an exclusive OR operation on the enciphered data γ and VOP start code. For example, if the enciphered data γ is "7234A19C" (hexadecimal), the output from the cipher superimposition unit 304 is "7234A02A".

The key generated by the key generation unit 108 is input to the scrambler 107, which scrambles the encoded data except for the start code using the key, and inputs the scrambled data to the compositing unit 111. The compositing unit 111 composites data obtained by superimposing the enciphered data γ on the VOP start code with the scrambled encoded data to have the former data at the head position.

Audio encoded data encoded by an external circuit is input from the input terminal 113, and is multiplexed by the multiplexer 305 with the video encoded data output from the selector 112 in units of frame. The multiplexed data is packetized, and packet data are output from the output terminal 115.

With a series of encoding, enciphering, and selection processes, encoded data security of which is warranted (its copyright is protected) can be generated without any redundancy. Since details of security for video are contained in the video encoded data, and the entire video encoded data is managed by IPMP, the video data can be easily managed.

Figure 7:
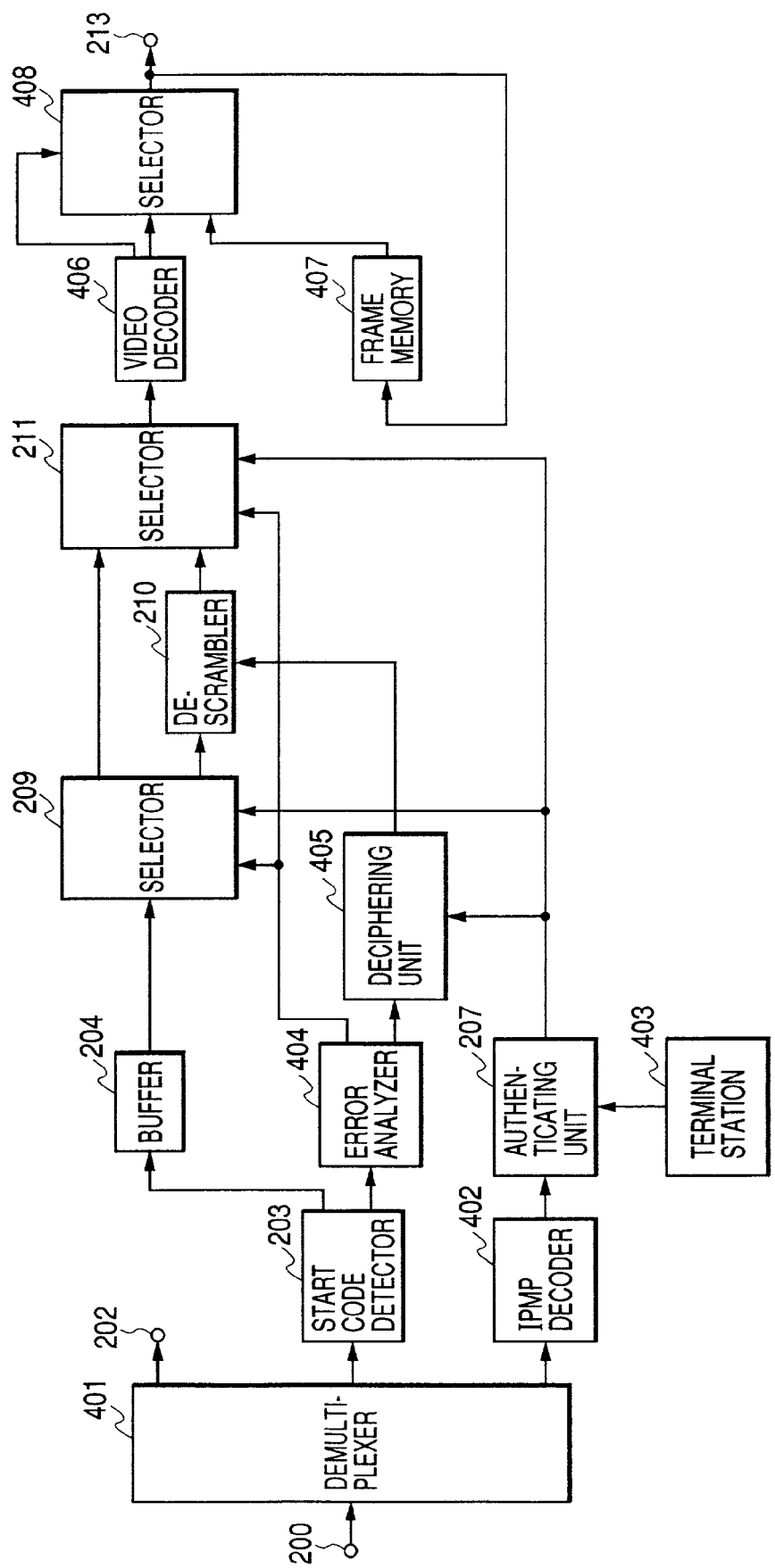
FIG. 7 is a block diagram showing the arrangement of an information processing apparatus according to the fourth embodiment of the present invention.

FIG. 7 is a block diagram showing the arrangement of an information processing apparatus according to the fourth embodiment of the present invention. Note that the same reference numerals denote the same building components as in the second embodiment (FIG. 5), and a detailed description thereof will be omitted. This embodiment processes encoded data generated by the third embodiment, and the input terminal 200 shown in FIG. 7 is equivalently connected to the output terminal 115 in FIG. 6.

Referring to FIG. 7, a demultiplexer 401 demultiplexes multiplexed data into IPMP encoded data, audio encoded data, and video encoded data. The video encoded data is output to the subsequent circuits in units of packets. An IPMP decoder 402 decodes IPMP information.

A terminal station 403 allows the user to input authentication data. An error analyzer 404 extracts the difference between the encoded data and VOP start code extracted by the start code detector 203. A deciphering unit 405 deciphers enciphered data by a predetermined scheme. A video decoder 406 outputs playback image data and data indicating if decoding is successful. A frame memory 407 holds last image data for one frame, which is normally decoded. A selector 408 selects and outputs one of the output from the video decoder 406 and the output from frame memory 407 in accordance with the decoding result of the video decoder 406.

The operation of an image data processing apparatus with the above arrangement will be described below.

Encoded data input from the input terminal 200 is input to the demultiplexer 401. The demultiplexer 401 demultiplexes IPMP encoded data and the encoded data in units of packets into video encoded data and audio encoded data. The demultiplexer 401 externally outputs the audio encoded data from the output terminal 202.

The IPMP encoded data is output to the IPMP decoder 402. The IPMP decoder 402 decodes the IPMP encoded data to acquire information that pertains to IPMP, i.e., authentication data that pertains to a sequence in this case. The authentication data is input to the authentication unit 207, and is compared with authentication data input by the user at the terminal station 403.

The video encoded data demultiplexed by the demultiplexer 401 is input to the start code detector 203, which separates encoded data corresponding to a start code and other encoded data as in the second embodiment, and outputs the data corresponding to the start code to the error analyzer 404, and other data to the buffer 204.

The authentication unit 207 compares the authentication data input from the terminal station 403 with the authentication data input from the IPMP decoder 402. When authentication is successful, and when the error analyzer 404 can detect the presence of enciphered data, the selectors 209 and 211 are instructed to select a process in the descrambler 210; otherwise, the selectors are instructed to be connected directly.

The error analyzer 404 compares the input encoded data from the first to thirty second bits with the VOP start code to obtain difference therebetween. That is, the error analyzer 404 computes the exclusive OR of the input data and the VOP start code value (000001B6). The result is input to the deciphering unit 405.

When no security is set, the selectors 209 and 211 are instructed to input the encoded data input by directly connecting them to the video decoder 406.

When security is set, and when the output from the authentication unit 207 indicates successful authentication, the input source/output destination of the selectors 209 and 211 are controlled to output data that has been processed by the descrambler 210; when authentication is unsuccessful, the selectors 209 and 211 are instructed to input the encoded data which is input by directly connecting them, to the video decoder 406.

The deciphering unit 405 deciphers enciphered data by a predetermined scheme to acquire a scramble key. The deciphered key is input to the descrambler 210.

The output from the selector 211 is input to the video decoder 406. The video decoder 406 decodes input data to generate a playback image. As a result, as for frames to which no security is given, the video decoder 406 directly receives and decodes the output from the demultiplexer 401 via the buffer 204 and the selectors 209 and 211 and can obtain a normal playback image. The decoded image data is externally output from the output terminal 213 via the selector 408, and is stored in the frame memory 407 at the same time.

On the other hand, when security is set, if authentication fails, the scrambled video encoded data is input, and since the enciphered data remains superimposed on the VOP start code, the VOP start code cannot be detected, and the encoded data cannot be decoded. In this case, the selector 408 reads out normally decoded last frame data from the frame memory 407 and outputs it to the terminal 213. At this time, the contents of the frame memory 407 are not updated.

Even when security is set, if authentication is successful, the scrambled data can be descrambled, and a normal playback image can be obtained. In this case as well, the image data is externally output from the output terminal 213 via the selector 408, and is stored in the frame memory 407 at the same time.

With a series of selection, deciphering, and decoding processes, image playback can be done in accordance with the intended security level. Since information that pertains to scrambling of an image is superimposed on video encoded data, easy management in units of frames is allowed. Furthermore, even when decoding is disabled, since a normally played-back image is output, an image can be prevented from suddenly disappearing and no noise image is displayed, thus preventing the user from being disrupted.

Figure 8:
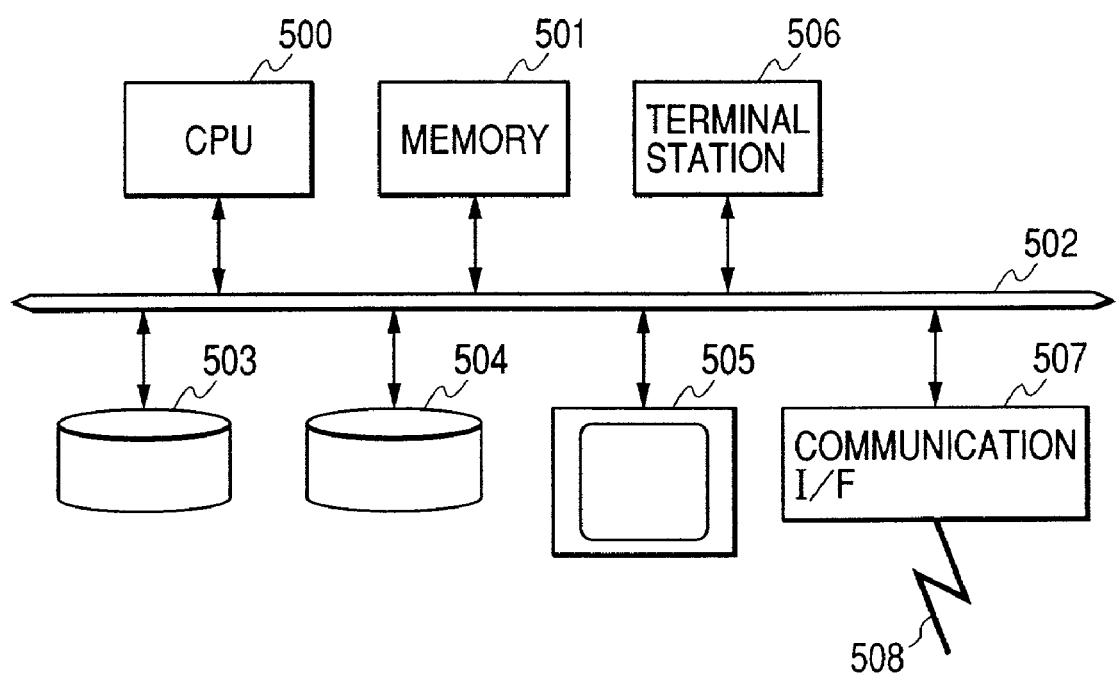
FIG. 8 is a block diagram showing the arrangement of an information processing apparatus according to the fifth and sixth embodiments of the present invention.

FIG. 8 is a block diagram showing the arrangement of an information processing apparatus according to the fifth embodiment of the present invention. In this embodiment, an encoding process of image data will be particularly explained. This embodiment will exemplify MPEG-1, but the present invention is not limited to such specific scheme. Refer to ISO 11172-2 for detailed specifications of MPEG-1.

Referring to FIG. 8, a central processing unit (CPU) 500 controls the overall apparatus, and executes various processes. A memory 501 stores an operating system (OS) and software required to control the apparatus, and provides a storage area necessary for arithmetic operations. Note that the memory 501 has an image area which stores the OS for controlling the overall apparatus to run various software programs, and software programs to run, and loads image data to encode it, a code area for temporarily storing encoded data, and a working area for storing parameters of various arithmetic operations, and the like.

A bus 502 connects various devices to exchange data and control signals. A storage device 503 stores software. A storage device 504 stores moving image data. A monitor 505 displays an image. A communication circuit 508 comprises a LAN, public line, radio line, broadcast wave, or the like. A communication interface 507 sends encoded data to the communication circuit 508. A terminal station 506 is used to start the apparatus and to set security.

In the aforementioned arrangement, prior to processing, the user selects at the terminal station 506 moving image data to be encoded from those stored in the storage device 504, and starts the apparatus. Then, software stored in the storage device 503 is mapped on the memory 501 via the bus 502, and is launched.

The encoding operation of moving image data stored in the storage device 504 by the CPU 500 will be described below with reference to the flow charts shown in FIGS. 9 and 10.

The encoding process will be explained below using FIG. 9.

Figure 9:
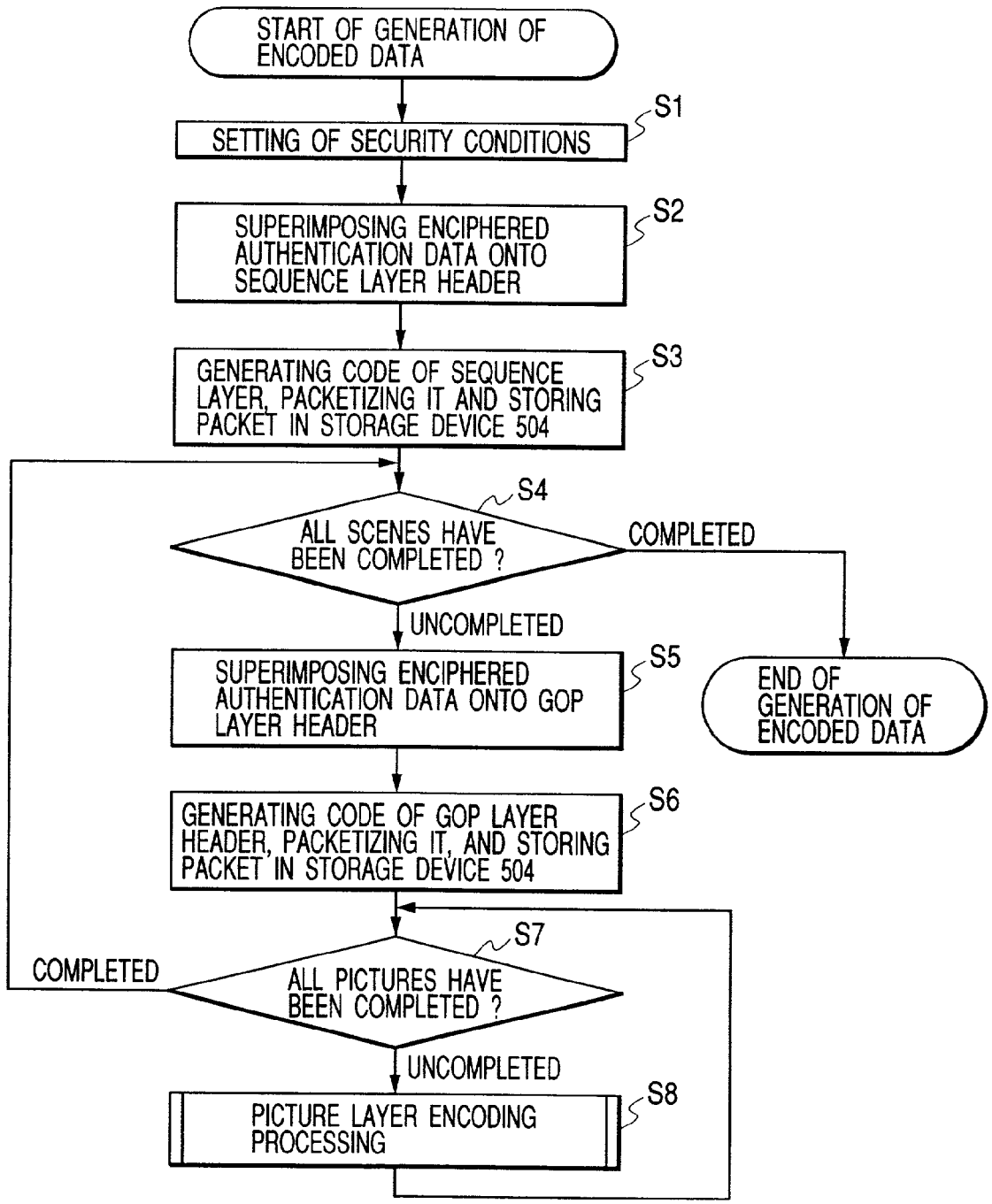
FIG. 9 is a flow chart showing an image encoding process in the fifth embodiment of the present invention.

Referring to FIG. 9, security setting conditions such as "sequence authentication data" used to authenticate in units of sequences, "scene authentication data" used to authenticate in units of sets of scenes, a picture to which security is given to start inhibition of decoding, a picture for which inhibition is canceled, "picture authentication data" used to authenticate in units of pictures, and the like are input in step S1, and are stored in the working area of the memory 501. The flow then advances to step S2.

In step S2, "sequence authentication data" is enciphered and the enciphered data is superimposed on a sequence header code (value "000001B3") of MPEG-1 by an exclusive OR operation, and the result is stored in a predetermined area of the memory 501. The flow advances to step S3.

In step S3, encoded data of another sequence layer is generated, is stored to follow the superimposed sequence header code, and is stored as packets in a predetermined area of the storage device 504. The flow then advances to step S4.

It is checked in step S4 if the process is complete for image data of all scenes to be encoded, when a GOP is considered as one scene. If the process is complete for all image data, the software ends; otherwise, the flow advances to step S5.

In step S5, "GOP authentication data" is enciphered and is superimposed on a GOP start code (value "000001B7") of MPEG-1 by an exclusive OR operation. The OR is stored in a predetermined area of the memory 501. The flow advances to step S6.

In step S6, encoded data of another GOP layer is generated, is stored to follow the superimposed GOP start code, and is stored as packets in a predetermined area of the storage device 504. The flow advances to step S7.

It is checked in step S7 if the encoding process is complete for all picture image data to be encoded in the GOP. If the encoding process is completed for all image data, the encoding process of the GOP ends, and the flow returns to step S4 to execute the encoding process of the next GOP. Otherwise, the flow advances to step S8 to encode in units of pictures.

The encoding process in units of pictures in step S8 in FIG. 9 will be described below using FIG. 10.

Figure 10:
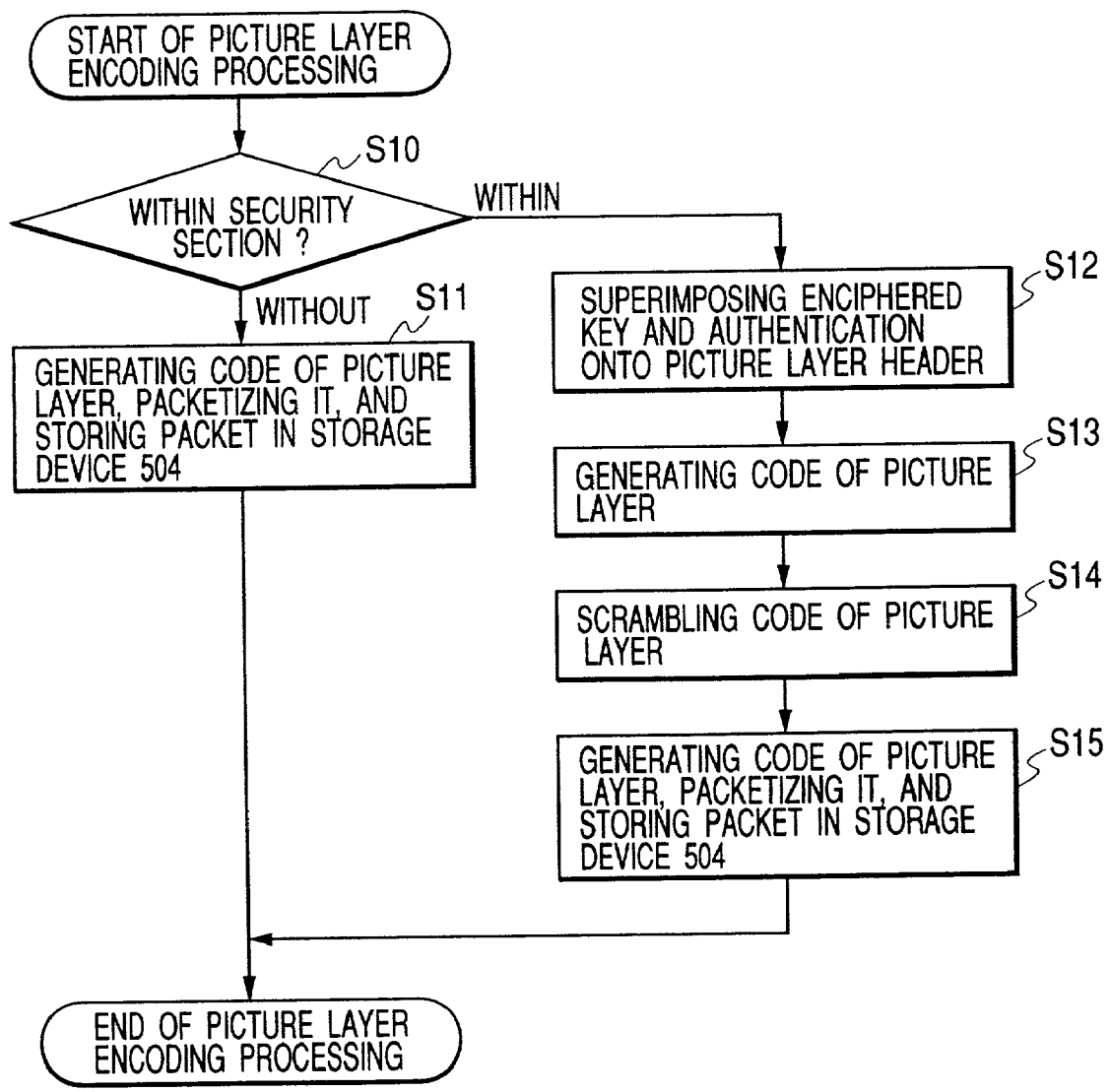
FIG. 10 is a flow chart showing an image encoding process in the fifth embodiment of the present invention.

In FIG. 10, it is checked in step S10 based on the picture conditions stored in the working area of the memory 501 in step S1 in FIG. 9 if picture image data to be encoded falls within a security section. If the picture to be encoded is included within the security section, the flow advances to step S12 to encipher it; otherwise, the flow advances to step S11 to execute a normal picture encoding process.

In step S11, image data of the picture to be encoded is read out from the storage device 504, and undergoes picture layer encoding of MPEG-1. The encoded data is stored as packets in a predetermined area of the storage device 504. The flow then advances to step S7 in FIG. 9 to process the next picture.

In step S12, a key for scrambling is generated, the generated key and "picture authentication data" are enciphered, the enciphered data is superimposed on a picture start code (value "00000100") of MPEG-1 by an exclusive OR operation, and the obtained data is stored in a predetermined area of the memory 501. The flow then advances to step S13.

In step S13, encoded data that pertains to the header of another picture layer is generated, and is stored following the superimposed picture start code. Furthermore, image data of the picture to be encoded is read out from the storage device 504, and is temporarily stored in the code area of the memory 501 after it is encoded.

In step S14, the encoded data generated in step S13 is scrambled using the key generated in step S12, and the flow advances to step S15.

In step S15, the superimposed picture start code and scrambled encoded data are stored as packets in a predetermined area of the storage device 504, and the flow advances to step S7.

With a series of encoding, enciphering, and selection processes described above, encoded data for which security is assured can be generated without any redundant data. Since security can be set in units of layers, various security levels can be given.

In the above embodiment, data is stored in the storage device 504. Alternatively, the data may be output onto the communication line 506 via the communication interface 505.

The sixth embodiment will especially explain the decoding process of image data. The arrangement of the information processing apparatus is the same as that shown in FIG. 8 of the fifth embodiment. Note that this embodiment also exemplifies MPEG-1, but the present invention is not limited to this. In this embodiment, the decoding process of encoded data generated in the fifth embodiment and stored in the storage device 504 will be exemplified.

In the arrangement shown in FIG. 8, prior to the processing, when the user selects at the terminal station 506 encoded data to be decoded from moving image encoded data stored in the storage device 504 and starts the apparatus, the software stored in the storage device 503 is mapped on the memory 501 via the bus 502 and is launched.

The decoding operation of encoded data stored in the storage device 504 by the CPU 500 will be explained below using the flow charts shown in FIGS. 11 and 12.

The decoding process will be explained below using FIG. 11.

Referring to FIG. 11, the first packet of the sequence to be decoded is read out from the storage device 504, and is stored in the code area of the memory 501 in step S20. The first 32 bits of the stored encoded data are compared with the sequence header code to demultiplex and decipher the superimposed "sequence authentication data". The flow then advances to step S21.

In step S21, the deciphered "sequence authentication data" is compared with authentication data input from the terminal station 506. If authentication is successful, the flow advances to step S22 to proceed with the decoding process. If authentication is unsuccessful, the decoding process ends to stop software.

In step S22, encoded data of another sequence layer stored in the code layer of the memory 501 is decoded, and the decoding result is stored in the working area of the memory 501, so that the data can be used in the subsequent processes. The flow then advances to step S23.

It is checked in step S23 if the process is complete for image data of all scenes (GOPs). If the process is complete for all image data, the software ends. Otherwise, the flow advances to step S24.

In step S24, a packet associated with the header of the GOP to be decoded is read out from the storage device 504, and is stored in the code area of the memory 501. The first 32 bits of the stored encoded data are compared with a GOP start code to demultiplex and decipher the superimposed "GOP authentication data", and the flow then advances to step S25.

In step S25, the deciphered "GOP authentication data" is compared with authentication data input from the terminal station 506. If authentication is successful, the flow advances to step S26 to proceed with decoding. If authentication is unsuccessful, the flow returns to step S23 to try to process the next GOP.

In step S26, encoded data of another GOP layer stored in the code area of the memory 501 is decoded, and the decoding result is stored in the working area of the memory 501, so that the data can be used by the subsequent processes. The flow then advances to step S27.

It is checked in step S27 if the process is complete for all picture image data to be decoded in the GOP. If the decoding process is complete for all image data, the decoding process of the GOP ends, and the flow returns to step S23 to decode the next GOP. Otherwise, the flow advances to step S28 to decode in units of pictures.

The decoding process in units of pictures in step S28 in FIG. 11 will be described below using FIG. 12.

In FIG. 12, packets associated with the picture to be decoded are read out from the storage device 504 and are stored in the code area of the memory 501 in step S31.

In step S32, the first 32 bits of the encoded data stored in the memory 501 are compared with a picture start code. If the value is "00000100", the flow advances to step S33 to execute a normal picture decoding process. That is, no security is set. On the other hand, if the value is not "00000100", since security is set, the flow advances to step S34 to process that data.

In step S33, encoded data of the picture to be decoded is read out from the code area of the memory 501 and undergoes picture layer decoding of MPEG-1. The decoded data is sent to and displayed on the monitor 505. To process the next picture, the flow advances to step S27 in FIG. 11.

On the other hand, in step S34 the superimposed "picture authentication data" and key for scrambling are demultiplexed and deciphered, and the flow advances to step S35.

In step S35, the deciphered "picture authentication data" is compared with authentication data input from the terminal station 506. If authentication is successful, the flow advances to step S36 to proceed with the decoding process. If authentication is unsuccessful, the flow advances to step S27 in FIG. 11 to process the next picture.

In step S36, encoded data of the picture layer stored in the code area of the memory 501 is read out, and is descrambled by the deciphered key. The flow advances to step S37.

In step S37, the descrambled picture encoded data undergoes picture layer decoding of MPEG-1, and the decoded data is sent to and displayed on the monitor 505. The flow then advances to step S27 in FIG. 11 to process the next picture.

With a series of selection, deciphering, and decoding processes, image playback can be done in accordance with the intended security level.

Since security can be set in units of layers, various security levels can be set. Since a system, which cannot decipher each authentication data, cannot recognize each start code, it cannot play back any data, thus implementing copyright protection.

As can be seen from the above description, in this embodiment, encoded data to which security is given while suppressing redundant data to be appended can be generated.

In this embodiment, security data can be set in correspondence with layers. Since security can be managed in units of pictures or frames, the present invention can be suitably applied to an edit process and the like.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An information processing apparatus comprising:
   first input means for inputting encoded data of information data consisting of plural frames;
   second input means for inputting security data for protecting at least one section of the information data;
   extraction means for extracting a start code of a frame group consisting of at least one frame, from the encoded data included in the section for which security is set and which is to be protected in accordance with the security data, wherein the start code is a code discriminable from the encoded data;
   superimposing means for superimposing the security data related to the frame group to which the start code belongs, on said start code; and
   output means for outputting the encoded data processed by scrambling means for scrambling the encoded data other than the start code in the section for which the security is set, wherein the security data contains key information to be used by the scrambling means.

2. An apparatus according to claim 1, wherein the security data contains information for an authentication process.

3. An apparatus according to claim 1, wherein the information data is image data, and the encoded data includes an MPEG-4 bitstream.

4. An apparatus according to claim 3, further comprising IPMP encoding means for generating IPMP data indicating information that pertains to the security, and wherein said output means outputs the IPMP data generated by said IPMP encoding means.

5. An apparatus according to claim 1, further comprising enciphering means for enciphering the security data, and wherein said superimposing means superimposes the security data enciphered by said enciphering means.

6. An apparatus according to claim 1, wherein the start code of the frame group comprising at least one frame is a start code of a predetermined frame, a start code of a predetermined frame group, or a start code of a predetermined sequence.

7. An information processing apparatus comprising:
  input means for inputting image encoded data comprising:
    a start code of a frame group, comprising at least one frame, the start code of the frame group including security data adaptively superimposed thereon; and
    image encoded data other than the start code that is adaptively scrambled in accordance with the security data,
    wherein the security data contains key information used in the scrambling for protecting at least a part of the image encoded data;
  code extraction means for extracting from the image encoded data a code which is located at a position where the start code is present, wherein the start code is a code discriminable from the encoded data;
  detection means for detecting the security data from the extracted code;
  descrambling means for descrambling the image encoded data other than the start code that is adaptively scrambled, in accordance with a detection result of said detection means; and
  decoding means for decoding the image encoded data descrambled by said descrambling means.

8. An apparatus according to claim 7, wherein the security data contains authentication data to be used to check the authenticity of the security data, and said apparatus further comprises authentication means for checking the authenticity of the security data.

9. An information processing apparatus comprising:
  input means for inputting image encoded data comprising:
    a start code of a frame group, comprising at least one frame, the start code of the frame group including security data adaptively superimposed thereon; and
    image encoded data other than the start code that is adaptively scrambled in accordance with the security data, wherein the security data contains key information used in the scrambling for protecting at least a part of the image encoded data;
  code extraction means for extracting from the image encoded data a code which is located at a position where the start code is present, wherein the start code is a code discriminable from the encoded data;
  detection means for detecting the security data from the extracted code;
  descrambling means for descrambling the image encoded data other than the start code that is adaptively scrambled, in accordance with a detection result of said detection means; and
  decoding means for decoding the image data descrambled by said descrambling means.

10. An apparatus according to claim 7, wherein the security data is enciphered security data, and said apparatus further comprises deciphering means for deciphering the enciphered security data.

11. An apparatus according to claim 7, wherein the image encoded data is MPEG-4 bitstream data.

12. An apparatus according to claim 11, wherein said input means inputs IPMP data indicating information which pertains to security.

13. An apparatus according to claim 12, wherein the IPMP data contains authentication data to be used to check the authenticity of the security data, and said apparatus further comprises authentication means for checking the authenticity of the security data in accordance with the authentication data.

14. An apparatus according to claim 13, wherein said descrambling means descrambles scrambled image encoded data in accordance with a checking result of said authentication means.

15. An apparatus according to claim 14, wherein the security data is enciphered data, and said apparatus further comprises deciphering means for deciphering the enciphered security data.

16. An apparatus according to claim 7, wherein the start code of the frame group comprising the at least one frame is a start code of a predetermined frame, a start code of a predetermined frame group, or a start code of a predetermined sequence.

17. An information processing method comprising the steps of:
  inputting encoded data of information data consisting of plural frames;
  inputting security data for protecting at least one section of the information data;
  extracting a start code of a frame group consisting of at least one frame from the encoded data included in the section for which security is to be set and which is to be protected in accordance with the security data, wherein the start code is a code discriminable from the encoded data;
  superimposing the security data related to the frame group to which the start code belongs, on said start code; and
  outputting the encoded data processed in a step of scrambling the encoded data other than the start code in the section for which the security is set,
  wherein the security data contains key information to be used in the scrambling step.

18. A method according to claim 17, wherein the security data contains information for an authentication process.

19. A method according to claim 17, wherein the encoded data includes an MPEG-4 bitstream.

20. A method according to claim 19, further comprising an IPMP encoding step of generating IPMP data indicating information that pertains to the security, and wherein said output step includes a step of outputting the IPMP data generated in the IPMP encoding step.

21. A method according to claim 17, further comprising an enciphering step of enciphering the security data, and wherein said superimposing step includes a step of superimposing the security data enciphered in said enciphering step on the start code.

22. A method according to claim 17, wherein the start code of the frame group comprising the at least one frame is a start code of a predetermined frame, a start code of a predetermined frame group, or a start code of a predetermined sequence.

23. An information processing method comprising the steps of:
  inputting image encoded data comprising:
    a start code of a frame group comprising at least one frame, the start code of the frame group including security data adaptively superimposed thereon; and
    image encoded data other than the start code that is adaptively scrambled in accordance with the security data, wherein the security data contains key information used in the scrambling for protecting at least a part of the image encoded data;
  extracting from the image encoded data a code which is located at a position where the start code is present, wherein the start code is a code discriminable from the encoded data;

detecting the security data from the extracted code;

descrambling the image encoded data other than the start code in accordance with the detection result of said detecting step; and decoding the descrambled image encoded data.

24. A method according to claim 23, wherein the security data contains authentication data to be used to check the authenticity of the security data, and said method further comprises an authentication step of checking the authenticity of the security data.

25. A method according to claim 24, wherein said descrambling step includes a step of descrambling scrambled image encoded data in accordance with a checking result in said authentication step.

26. A method according to claim 23, wherein the security data is enciphering data, and said method further comprises as deciphering step of deciphering the enciphered security data.

27. A method according to claim 23, wherein the image encoded data is MPEG-4 bitstream data.

28. A method according to claim 27, wherein said inputting step includes a step of inputting IPMP data indicating information which pertains to security.

29. A method according claim 28, wherein the IPMP data contains authentication data to be used to check the authenticity of the IPMP data, and said method further comprises an authentication step of checking the authenticity of the IPMP data in accordance with the authentication data.

30. A method according to claim 29, wherein said descrambling step includes a step of descrambling scrambled image encoded data in accordance with a checking result in said authentication step.

31. A method according to claim 29, wherein the security data is enciphered data, and said method further comprises a deciphering step of deciphering the enciphered security data.

32. A method according to claim 23, wherein the start code of the frame group comprising the at least one frame is a start code of a predetermined frame, a start code of a predetermined frame group, or a start code of a predetermined sequence.

33. An information processing method comprising the steps of:

inputting image encoded data that forms a hierarchical structure;

extracting a start code indicating a head of a predetermined layer from the image encoded data, wherein the start code is a code discriminable from the image encoded data; and superimposing security data for protecting at least a part of an image onto the start code extracted in said extracting step, wherein the security data contains key information to be used in a scrambling step.

34. A method according to claim 33, further comprising an enciphering step of enciphering the image encoded data in accordance with the security data.

35. An information processing method comprising the steps of:

inputting encoded data in which security data for protecting at least a part of an image is superimposed on a start code indicating a head of a predetermined layer of image encoded data that forms a hierarchical structure, wherein the start code is a code discriminable from the encoded data and wherein the security data contains key information used in a scrambling step;

extracting from the encoded data a code which is located at a position where the start code is present;

detecting the security data from the extracted code; and decoding the encoded data in accordance with a detection result in said detecting step.

36. A method according to claim 35, wherein the encoded data is enciphered data, and said decoding step includes a step of deciphering the enciphered encoded data.

37. A computer readable storage medium which stores a control program that implements an information processing method recited in claim 17.

38. A computer readable storage medium which stores a control program that implements an information processing method recited in claim 23.

39. A computer readable storage medium which stores a control program that implements an information processing method recited in claim 33.

40. A computer readable storage medium which stores a control program that implements an information processing method recited in claim 35.

* * * * *

UNITED STATES PATENT AND TRADEMARK OFFICE
CERTIFICATE OF CORRECTION

PATENT NO. : 7,099,473 B2 Page 1 of 1
APPLICATION NO. : 09/761721
DATED : August 29, 2006
INVENTOR(S) : Mitsuru Maeda It is certified that error appears in the above-identified patent and that said Letters Patent is hereby corrected as shown below:

ON THE TITLE PAGE, AT ITEM (56):
Other Publications, "Berkely University," should read --Berkeley University,--; and "Carleton Univeristy," should read --Carleton University,--.

COLUMN 1:
Line 44, "object," should read --objects,--.
Line 64, "of that frame" should read --that frame--.

COLUMN 15:
Lines 30-51, Claim 9 should read --9. An apparatus according to claim 8, wherein said descrambling means descrambles the scrambled image encoded data in accordance with a checking result of said authentication means.--.

COLUMN 17:
Line 17, "as deciphering" should read --a deciphering--.

Signed and Sealed this

Twenty-second Day of May, 2007

JON W. DUDAS
*Director of the United States Patent and Trademark Office*